INVENTOR
GEORGE M. CHAPPEL

BY Beveridge & DeGrandi
ATTORNEYS

INVENTOR
GEORGE M. CHAPPEL

BY Beveridge & De Grandi
ATTORNEYS

3,812,032
PROCESS FOR TREATING DOMESTIC AND INDUSTRIAL LIQUID WASTES
George M. Chappell, Drakes Island, Box 96, Wells, Maine 04090
Filed Aug. 6, 1971, Ser. No. 169,739
Int. Cl. C02b 1/20
U.S. Cl. 210—52     21 Claims

ABSTRACT OF THE DISCLOSURE

A process for treating domestic, municipal or industrial liquid waste to reduce B.O.D. of the waste comprising adding a sufficient amount of an acid formula and a sufficient amount of an alkaline formula to said waste, to thereby cause evolution of heat and cause flocculation of solids, and separating the resulting solids from the liquid. The novel acid formula and alkaline formula are disclosed. Liquid wastes treated by the process of this invention can be safely discharged into rivers, lakes and streams. In addition the process is extremely efficient since flocculation is rapid, and in many instances starts immediately upon the addition of either formula to the liquid waste.

---

Figure 1:
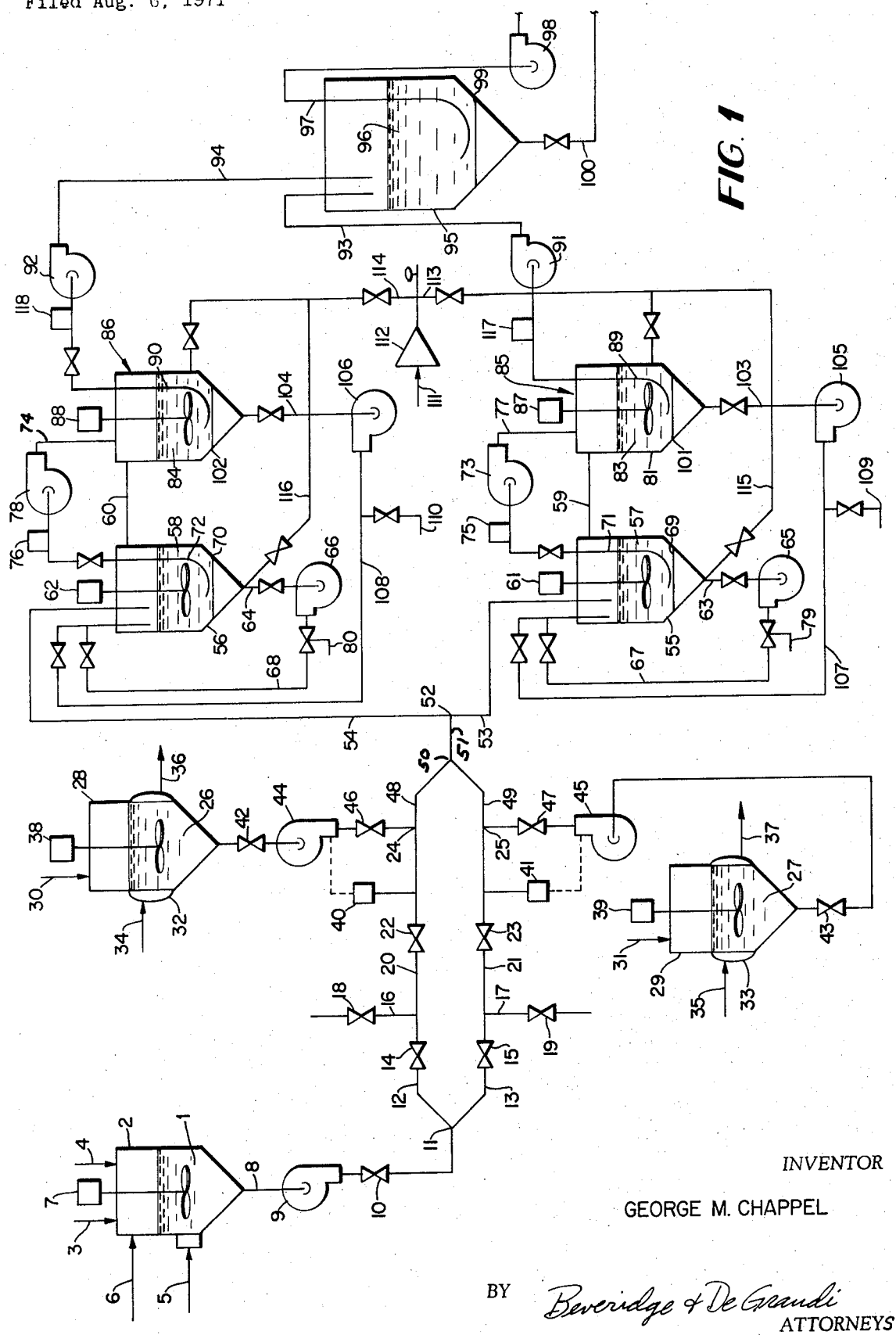

This application relates to pollution control methods. More particularly this invention relates to methods for treating domestic, municipal and industrial liquid wastes.

Efficient disposal of domestic, municipal and industrial liquid wastes is important to the health of any community. A simple method of waste disposal is by dilution; that is, the waste is dumped into an available body of water such as a river or lake containing oxygen which destroys the organic material in the waste. Even though the resulting pollution of the river or lake is only temporary, public condemnation has lead to the development of methods of treating the wastes prior to disposal. These methods include both mechanical and and chemical procedures.

The impurity in a particular liquid waste and the amount of treatment required is usually measured on one of two bases: (1) the amount of suspended solids, or (2) the biological oxygen demand.

Suspended solids are generally separated from a liquid waste by mechanical methods or chemical treatment. Mechanical methods of removing solids include passing the waste or sewage through screens, filters, grit chambers (shallow rectangular tanks in which the velocity of flow is checked so as to cause the grit to settle out, carrying some of the organic material with it), sedimentation basins, and trickling filters. Chemical treatment methods include precipitation of solids from the waste by coagulation. The coagulated materials are then removed by sedimentation or filtration.

The disposal of the solids removed by any of these processes depends upon the local conditions. In some cases they are buried, burned or sold as fertilizer after filtering and drying. The liquids remaining after the removal of solids are usually chlorinated to destroy harmful microorganisms, such as aerobic bactertia, and then discharged into near-by streams.

Biological oxygen demand, hereinafter referred to as "B.O.D.," is a measure of the amount of the amount of impurities in a waste as determined by the amount of oxygen required to oxidize these impurities. It is desirable that treated liquid wastes have a sufficiently low B.O.D. in order that there is sufficient oxygen in the liquid waste to support marine life when the waste is discharged into a lake or stream. Otherwise, oxygen in the waste and oxygen in the lake or stream water is required to oxidize impurities in the waste.

Many of the processes now being used to treat liquid wastes involve the use of costly equipment and high operating and maintenance costs. Furthermore, not all of the prior art processes produce a treated liquid having a low enough B.O.D. suitable for discharge in lakes or streams. Also, not all of the processes currently in use are suitable for treating some industrial wastes, such as the liquid waste from a leather tanning operation, a paper mill, a textile plant, etc. Thus, there exists a definite need in the art for an effective, low cost means of generally purifying liquid containing wastes and reducing the B.O.D. thereof. It is a purpose of this invention to fulfill this need in the art.

According to this invention there is provided a process for treating domestic, municipal or industrial liquid wastes to reduce the B.O.D. of both the suspended solids and aerobic and anerobic bacteria. The process involves adding a sufficient amount of an acid formula and a sufficient amount of an alkaline formula to the waste. This results in the evolution of heat and the flocculation of solids. Preferably, the resulting mixture is then aerated during at least a portion of the time period in which heat is evolved. The solids and liquids are separated and recovered.

A preferred embodiment involves initially dividing the waste into a first portion and a second portion. A sufficient amount of an acid formula is added to the first portion to obtain a mixture having a pH of about 0-3. A sufficient amount of alkaline formula is added to the second portion to obtain a mixture having a pH of about 9-14. The first and second portions are then mixed to cause the flocculation and evolution of heat previously referred to. It is also preferred to aerate the waste prior to separation of solids and liquids. The liquids are recovered, and if desired subjected to further processing before being discharged into a lake, river or stream. The solids can be discarded or recycled to reduce the cost of the process. Depending upon the nature of the waste treated, some solids recovered are useful as fertilizer.

According to this invention there are also provided acid and alkaline formulas. The term "acid formula" as used herein is intended to mean a composition for flocculating and oxidizing domestic, municipal and industrial liquid wastes which when added to the first portion of the waste described above renders it acidic and within the pH range specified.

The acid formulae or compositions for use in the process of this invention comprise:

(a) about 30–98 weight percent aluminum sulfate,
(b) about 2–20 weight percent of an alkali metal chloride, and
(c) about 0.0005–0.1 weight percent of sodium or potassium hypochlorite.

Preferably the acid composition also includes about 0–25% by weight of an inorganic acid selected from $H_3PO_4$, HCl, $H_2SO_4$ and $HNO_3$ and about 0–25% by weight of an organic acid selected from oxalic, formic, acetic and lactic acid. For some effluents it may be desirable to add a small amount of alcohol such as isopropyl alcohol to the formula. Generally speaking it may be used up to about 9% by weight. Alcohol generally aids in keeping the acid formula in solution at low temperatures.

The term "alkaline formula" as used herein is intended to mean a composition for flocculating and oxidizing domestic, municipal and industrial liquid wastes which when added to the second portion of the waste renders it alkaline and within the pH range specified.

The alkaline formulae or compositions for use in the process of this invention comprise:

(a) about 10–25 weight percent aluminum sulfate,
(b) about 35–60 weight percent sodium aluminate,
(c) about 15–35 weight percent sodium hydroxide,
(d) about 1–10 weight percent of an alkali metal chloride,
(e) about 0.5–4 weight percent sodium or potassium hypochlorite,
(f) about 1–7 weight percent alkali metal nitrate,
(g) about 0.25–5 weight percent of an alkali metal carbonate, and
(h) about 0.25–5 weight percent of an alkali metal bicarbonate.

As with the acid formula, alcohol may also be employed to keep the formula in solution at low temperatures. Further, the alkaline formula can preferably contain about 0–2 weight percent calcium carbonate, and about 0–2 weight percent calcium chloride.

The process of this invention provides an effective and low cost means of reducing solids content and reducing the B.O.D. in liquid wastes. The process of this invention can be used to treat liquid wastes from municipalities, private dwellings, commercial dwellings and many industries. The desirable results of this invention are accomplished by the use of inexpensive chemicals, simplified mechanical processes and optional reuse of treated solids. The acid and alkaline formulae of this invention can be used to increase the productivity of many existing filter plants by at least 65–75 percent by permitting the elimination of some currently used mechanical procedures. Liquid wastes treated by the process of this invention can be safely discharged into lakes, rivers or streams. Considerable financial savings can be realized by the Federal Government, States, municipalities, industry and others.

This invention will now be described relative to certain preferred embodiments and illustrations wherein the Figures are schematic diagrams of equipment which can be used in the application of this invention to the treatment of domestic, municipal or industrial waste.

The process of this invention is applicable to the treatment of liquid wastes generally. The liquid is usually water containing aerobic and anaerobic bacteria invisible to the unaided eye. The process of this invention is particularly suitable for treating such waters containing suspended solids. If the waste does not have the proper pH, an adjustment can be made by the addition of an organic or inorganic acid or base.

Two factors must be considered in determining the proper pH for a particular waste. First, the type of effluent to be treated, average pH of the effluent and pH range should be determined by means well known to those skilled in the art. Second, the pH of the waste should be adjusted to about 2–5. Sulfuric and phosphoric acids are particularly preferred chemicals for making pH adjustments in the waste. Adjustment and control of the pH are important to minimize premature coagulation of ingredients in the waste, neutralize a great percentage of lime or other highly alkaline ingredients, and maintain the waste as a liquid which will readily flow through the processing equipment. Control of the pH permits a reduction in the cost of chemicals required for B.O.D. reduction.

A preferred acid formula consists essentially of the following ingredients:

(a) about 78–82 weight percent aluminum sulfate,
(b) about 6–8 weight percent of an alkali metal chloride,
(c) about 10–12 weight percent of an inorganic acid selected from the group consisting of phosphoric, hydrochloric, sulfuric and nitric acids,
(d) about 1–3 weight percent of an organic acid selected from the group consisting of oxalic, formic, acetic and lactic acids,
(e) about .001–.002 weight percent sodium or potassium hypochlorite.

The acid formula is preferably prepared by boiling components (a) and (b) in the above formula in water until a clear solution is obtained. This is conveniently accomplished by adding component (a) slowly during boiling. When components (a) and (b) have been dissolved in the water, components (c) and (d) are added and boiling continued. After all of the components have been added, the solution is boiled for about 5–10 minutes or until clear. The solution is then cooled to about 160° F. Component (e) is gradually added, and the liquid is again brought to a boil. The resulting mixture is then cooled to about 68° F. yielding a yellow paste. One gallon of this acid formula weighs about 10.5–13 pounds per gallon.

A preferred alkaline formula consists essentially of the following ingredients:

(a) about 15–19 weight percent aluminum sulfate,
(b) about 34–42 weight percent sodium aluminate,
(c) about 22–28 weight percent sodium hydroxide,
(d) about 1.8–2.2 weight percent of an alkali metal chloride,
(e) about 1.0–2.0 weight percent sodium or potassium hypochlorite,
(f) about 2–6 weight percent sodium or potassium nitrate,
(g) about 0.2–1 weight percent calcium carbonate,
(h) about 0.2–1 weight percent calcium chloride,
(i) about 0.4–2 weight percent sodium carbonate, and
(j) about 0.4–2 weight percent sodium bicarbonate.

The alkaline formula can conveniently be prepared by dissolving about 5 pounds of components (b), (g), (h), and (i) in one gallon of boiling water. The resulting solution is boiled until clear. Component (j) is added slowly to the boiling solution, and boiling continued until dissolved. Component (b) is similarly added slowly until dissolved. Then, the solution is removed from the heat and component (a) is added very slowly until dissolved. After component (a) is dissolved, boiling is continued until all solids are in solution. The solution is removed from the heat and components (e) and (f) are cautiously added. The resulting mixture is then heated to boiling until a uniform solution is obtained. The solution is then cooled to obtain a yellowish brown paste having a density of about 11.5–14 lbs./gal. at about 68° F.

It will be understood that mixtures of the inorganic acids and mixtures of the organic acids can be used in the acid formula. Similarly, mixtures of the various salts in the alkaline formula can be used, e.g. both Na and K nitrate.

The liquid waste at the proper pH is divided into two portions. A sufficient amount of the acid formula is added to the first portion to obtain a mixture having a pH of about 0–3, preferably about 1.5–2.5. When the acid formula contacts the first portion of liquid waste some flocculation occurs. Similarly, a sufficient amount of alkaline formula is added to the second portion to obtain a mixture having a pH of about 9–14, preferably about 9.5–11. Some flocculation occurs when the alkaline formula contacts the second portion of liquid waste.

The portion containing the acid formula is mixed with the portion containing the alkaline formula resulting in further flocculation of components in each formula. The flocculant is insoluble in water, and can be separated with any solids originally suspended in the liquid waste. The reaction of components in the acid and alkaline formulas generates heat of neutralization. Chemical reaction occurs instantaneously, and continues over a period of time as the acid and alkaline components in each portion of waste contact each other. It has been found that the heat generated by this reaction kills at least a portion of the aerobic bacteria present in the liquid waste thereby reducing the B.O.D. of the waste. Further B.O.D. reduction is accomplished by means of the oxidizing agents in each of the formulas, and by the change in pH which results from the neutralization reaction. Thus, it is usually not necessary to chlorinate liquids remaining after the removal of solids in order to destroy harmful microorganisms. It has also been found that the use of an acid formula and an alkaline formula as described above results in a treated liquid relatively free of undesirable odors.

The flocculant, in the nature of a solid, is separated from the liquid, carrying with it any suspended solids in the waste. Separation can be effected by means well known to those skilled in the art; for example, filtration centrifugation, evaporation, etc. Separation is preferably accomplished by permitting the flocculant to settle by the action of gravity. This obviates the need for costly separation equipment.

The solids frequently contain active chemicals; thus the solids can be recycled to the process to reduce the cost of operation. The amount recycled will of course depend upon the required B.O.D. reduction in the treated waste, and the amounts of active chemicals in the solids. These factors can readily be determined by those skilled in the art.

The liquid remaining after the separation of solids can be subjected to further processing. For example, it is preferred to adjust the pH of the liquid to about 6–8 before discharging it into a lake or stream.

The process of this invention can be operated on either a batch or continuous basis, and will be more clearly understood by reference to FIG. 1 which is a flow diagram of a continuous process used in practicing this invention.

A waste material 1 having solid materials suspended therein enters vessel 2 through line 6. Vessel 2 is usually covered to prevent the escape of obnoxious odors. Vessel 2 is provided with mixing means 7. Other vessels used in the process are also generally covered for the same reason. The pH of the waste 1 in vessel 2 can be measured by sampling or automatically, such as by the pH electrode at 5. If necessary, the pH can be adjusted by adding acid through line 3 or alkali through line 4. The pH of the waste should preferably be about 2–5 at the start. The liquid waste 1 is removed from vessel 2 via pump 9 through line 8. Valve 10 can be used to control the liquid level in vessel 2 or the feed rate of liquid waste 1 to the process. The liquid waste is divided at 11 into a first portion in line 12, and a second portion in line 13. Lines 12 and 13 are equipped with automatic or manual control valves 14 and 15 to control the flow rates of material in each line. Also provided are lines 16 and 17 having valves 18 and 19, respectively, through which excess waste can be removed from the system, and recycled to vessel 2 or some other vessel (not shown in the Figure) for storage and later treatment.

It will of course be understood that tank 2 and related equipment need not be used. For example, waste can be pumped in 2 separate portions directly from the source of the waste into lines 12 and 13. Adjustments to pH can be made directly in the pipeline in such a case.

The process described in FIG. 1 is particularly advantageous when septic tank wastes, municipal or industrial wastes are to be treated. For example, septic tank waste can be added to tank 2 in FIG. 1. It is preferred to adjust pH of this waste using $H_2SO_4$ or NaOH. The septic tank waste can then be combined with other waste, such as waste pumped directly from the source into lines 12 and 13 as previously described.

The first portion of liquid waste flows through line 20 and valve 22 to point 24 where it is mixed with acid formula 26 from vessel 28. Some flocculation occurs when the acid formula contacts the waste. Acid formula is prepared as previously described introducing the ingredients into vessel 28 through line 30. Vessel 28 can be provided with heating means, such as a jacket 32 into which steam 34 is introduced. Condensate is removed through line 36. Vessel 28 can also be provided with means for mixing the acid formula, such as mixer 38. It will be understood that the acid formula can be heated by other means.

The rate of addition of acid formula 26 to the waste in line 20 is a function of the pH of the waste in line 20. The pH of a liquid waste can be measured automatically as at 40, and the pumping rate of pump 44 controlled to provide the proper amount of acid formula at point 24. In the alternative, the flow of acid formula 26 can be controlled by automatic control valves such as 42 and 46 and pump 44 in FIG. 1. As stated hereinabove, sufficient acid formula is added to insure that the waste is acidic preferably having a pH of about 0–3, and most preferably about 2. When using the acid formula of this invention, proper pH of the waste also insures sufficient formula for substantially complete flocculation.

In a similar fashion, the second portion of liquid waste flows through line 21 and valve 23 to point 25 where alkaline formula 27 in vessel 29 is added. Some flocculation occurs when the alkaline formula contacts the waste. Vessel 29 is provided with line 31 for the introduction of components comprising the alkaline formula. Vessel 29 is also provided with heating means, such as jacket 33, steam line 35, condensate line 37 and mixer 39. It will be understood that other suitable heating means can be employed. The rate of addition of alkaline formula 27 is similarly a function of the pH of the waste in line 21. The pH can be measured at 41, and the flow rate of alkaline formula 27 controlled by valves 43 and 47 and pump 45. As stated hereinabove, sufficient alkaline formula is added to insure that the waste is alkaline, preferably having a pH of about 9–14, and most preferably about 10–11. When using the alkaline formula of this invention, such pH's also insure sufficient formula for substantially complete flocculation.

Preferably, both the acid and alkaline formulas are heated to a temperature of about 110° F.–150° F. prior to addition to the first and second portions of the waste. It is thereby easier to maintain the consistency of each formula and uniformity of flow.

When treating certain types of waste, the pH of the second portion of waste will be about 13–14 prior to the addition of alkaline formulas. Under these conditions, it is preferable that valve 47 be set to provide a substantially continuous feed rate of alkaline formula of about 25–50 parts per million parts of waste to be treated.

The first portion of liquid waste in line 48 is mixed at point 50 with the second portion of liquid waste in line 49. The combined streams pass through line 51 into line 53 and into equipment shown schematically in the lower half of FIG. 1, or into line 54 and then into equipment shown schematically in the upper half of FIG. 1. Use of these alternate flow paths will be more apparent from the discussion which follows.

When streams 48 and 49 combine at point 50, additional flocculation occurs due to the reaction of ingredients in the acid and alkaline formulas. Also, heat of neutralization is generated. Assume all of the material at point 50 flows via streams 51 and 54 to vessel 56. The liquid 58 containing flocculant, flows into vessel 56 until the vessel is full, at which time the flow of material from point 52 is diverted to vessel 55 through line 53. Vessel 56 is provided with an overflow line 60 to vessel 86 to avoid spillage in the event the flow in line 54 is not diverted to line 53 at the proper time. Vessel 56 can optionally be provided with an overflow line to a storage vessel (not shown).

Vessel 56 is preferably provided with a mixer 62 to mildly agitate the liquid 58 as it is being added through line 54 to vessel 56. The vessel is also provided with a discharge 64 through which liquid 58 is preferably recirculated by pump 66 and line 68 to the top of the vessel in order to more efficiently contact the active chemicals in each formula. A line 80 is provided after the discharge of pump 66 to facilitate removal of a portion of the recirculated liquid, such as for sampling. Vessel 56 is also provided with a false bottom 70 such as a screen, to permit separation of liquids and solids.

When vessel 56 is filled with liquid 58, air 111 compressed by compressor 112 is fed to vessel 56 through lines 114 and 116. The compressed air is uniformly distributed around the interior of vessel 56, such as by a perforated hose (not shown in FIG. 1). The compressed air is introduced below false bottom 70 and allowed to bubble through the liquid 58. When the flow of compressed air to vessel 56 is started, recirculation of liquid 58 through pump 66 is stopped.

The mixer 62 and flow of compressed air are shut off and the liquid 58 in vessel 56 is allowed to stand to permit flocculant and suspended solids to settle to the bottom of the vessel through screen 70. This is complete when the liquid in vessel 56 appears clear to the unaided eye. Generally, the time required for the solids to practically completely settle is only about 30 minutes.

At the end of the settling period, the liquid in vessel 56 is transferred through line 72 by pump 78 and line 74 to vessel 86. When the liquid above the screen 70 in vessel 56 has been practically removed, pump 78 can be stopped and more waste added to vessel 56 through line 54 as before. This new charge of waste from line 50 is recirculated, agitated, aerated and allowed to settle as previously described.

The liquid 84 in vessel 86 is free of obnoxious odors and clear, has a low B.O.D. and usually has an acceptable pH for disposal, e.g. about 6–8. The pH of liquid 58 can be measured by pH probe 76 and the pH of liquid 84 can be adjusted, if necessary, by adding an acidic or alkaline material, such as an inorganic or organic acid or base, to vessel 86 and mixed by 88. The liquid is then transferred through line 90 by pump 92 and line 94 to vessel 95. In the alternative, the liquid can be pumped through line 90 and pump 92 directly to a lake or stream. Vessel 95 permits further treatment of the liquid 96 if required. (For example aeration, settling, etc.) Finally, liquid 96 can be pumped through line 97 by pump 98 into a river lake, stream or reused.

Vessel 95 can also be provided with a screen 99 to permit separation of any remaining solids. Solids can be removed from vessel 95 through line 100 and discarded or used as a by-product.

Referring again to vessel 86 in FIG. 1, any solids in liquid 84 pass through screen 102 to the bottom of the vessel. These solids can be returned to vessel 56 through line 104 by pump 106 and line 108 if the solids contain active chemicals.

Solids can also be removed through line 110 and discarded or recovered as by-products.

As previously noted, when vessel 56 is filled, the flow of combined waste from point 52 in the FIG. 1 is diverted to vessel 55 via line 53 as shown in the lower half of the Figure. Liquid 57 in vessel 55 is subjected to the same treatment as liquid 58 in vessel 56. Vessel 55 can be provided with an overflow line 59 to vessel 81 or an overflow line to a storage tank (not shown in FIG. 1).

Vessel 55 is preferably provided with a mixer 61 to mildly agitate the liquid 57 as it is being added through line 53 to the vessel. The vessel is also provided with a discharge line 63 through which liquid 57 is preferably recirculated by pump 65 and line 67 to the top of the vessel. Vessel 55 is also provided with a false bottom 69 such as a screen, to permit separation of liquids and solids.

After vessel 55 has been filled with liquid 57 air 111 compressed by compressor 112 is fed to the vessel through lines 113 and 115. The compressed air is uniformly distributed around the interior of vessel 55, such as by means previously described. The compressed air is allowed to bubble through the liquid 57, and recirculation of liquid 57 through pump 65 is stopped.

The mixer 61 and flow of compressed air are shut off, and the liquid 57 in vessel 55 is allowed to stand to permit flocculant and suspended solids to settle to the bottom of the vessel through screen 69. When the liquid in vessel 55 appears substantially clear to the unaided eye, it is transferred by pump 73 through lines 71 and 77 to vessel 81. When the liquid above the screen 69 in vessel 55 has been practically removed, a new charge of liquid waste can be added to the vessel.

The pH of liquid 57 from vessel 55 can be measured by electrode 75 and the pH of liquid 83 adjusted to the same level as stated relative to the tank 86 discussion hereinabove, by adding an organic or inorganic acidic or alkaline material to vessel 81 through line 85. The liquid is then transferred by pump 91 through lines 89 and 93 to vessel 95. In the alternative, the liquid can be pumped through line 89 by pump 91 directly to a lake or stream.

Any solids in the liquid 83 in vessel 81 pass through screen 101 to the bottom of the vessel. These solids can be returned to vessel 55 by pump 105 and lines 103 and 107. Solids can also be removed through lines 79 and 109 and discarded, recovered as by-products, or recycled to the process.

When vessel 55 has been filled with liquid waste, the flow of combined waste from point 52 in FIG. 1 is again diverted to vessel 56 through line 54. It will be apparent that the flow of material from point 52 is alternated between vessels 55 and 56 in FIG. 1. It will be apparent to those skilled in the art that more than two treatment stages beyond point 52 can be used depending upon the amount of waste to be treated and the capacity of each stage. For convenience, only two stages are shown in FIG. 1 for treatment of waste from point 52.

When liquid is being pumped into any vessel described above, it is preferred that the flow of liquid be directed at about a 45° angle relative to a vertical side of the vessel to create a cascading effect down the wall of the vessel. This increases the turbulence in the flow of liquid permitting more efficient contact of active chemicals in each formula.

This invention will be more clearly understood by reference to the following example.

EXAMPLE

Figure 2:
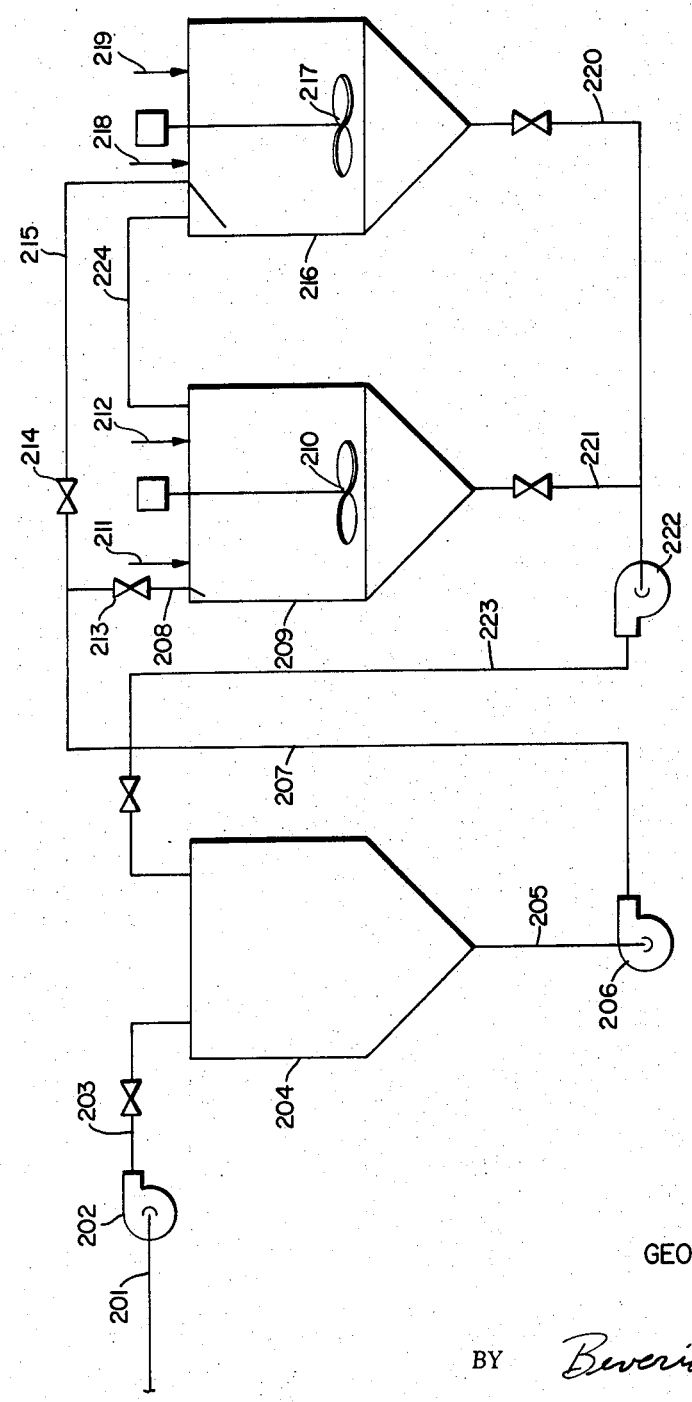

In this example, municipal, industrial and domestic waste is treated in a batch process using equipment depicted in FIG. 2.

In this process, about 900 gallons of Saco River water is pumped directly from the river through line 201, pump 202 and 203 into a 1,000 gallon capacity tank 204. To tank 204 are also added about 40 gallons of untreated effluent from the City of Biddeford, Maine, 10 gallons of septic tank waste, and 50 gallons of effluent from a commercial tanning operation.

A sample of the waste in tank 204 is drawn for testing. The results of the tests are reported in Column 4 of Table I.

500 gallons of waste are pumped from tank 204 to tank 209 in FIG. 2. The waste is transferred by pump 206 through lines 205, 207, and 208. Valve 213 is open and valve 214 is closed to prevent the waste from flowing into tank 216. The waste from line 208 is directed at a 45° angle against the vertical side of tank 209 to permit the waste to cascade down the vertical wall of the tank.

After about 200 gallons of waste is added to tank 209, about 100 cc. of acid formula at about 140° F. is added to the tank through line 211. After all the acid has been added, about 50 cc. of alkaline formula at about 120° F. are added to the tank through line 212. A sample is taken, and the degree of flocculation observed and pH measured. The flocculation is too slow and the pH is about 3. About 50 cc. of acid formula is added to tank 209 to reduce the pH to about 2.25. The rate of flocculation improves. Before this second addition, mixer 210 is turned on.

After tank 209 is about full, another 50 cc. of alkaline formula are added and another sample is taken. The rate of flocculation as visually determined was satisfactory, and the pH of the sample measured about 4.

The following acid formula, prepared as previously described, is used in this example:

| | Lbs. |
|---|---|
| Aluminum sulphate crystals $Al_2(SO_4)_3 \cdot 18H_2O$ | 10.74 |
| Sodium chloride | 1 |
| Phosphoric acid (75% $H_3PO_4$) | 2 |
| Oxalic acid crystals $(COOH)_2 \cdot 2H_2O$ | 0.3 |
| Sodium hypochlorite (12.5% NaOCl) | 0.1 |
| Water: Balance to yield paste of 12.2 lb./gal. | |

The following alkaline formula, prepared as previously described, is used in this example:

| | Lbs. |
|---|---|
| Aluminum sulphate crystals $Al_2(SO_4)_3 \cdot 18H_2O$ | 2.5 |
| Sodium aluminate | 5.62 |
| Sodium hydroxide | 3.75 |
| Sodium chloride | 0.317 |
| Sodium hypochlorite (12.5% NaOCl) | 1.875 |
| Sodium nitrate | 0.626 |
| Calcium carbonate | 0.0626 |
| Calcium chloride | 0.0626 |
| Sodium carbonate (58% lt. soda ash) | 0.0935 |
| Sodium bicarbonate | 0.0935 |
| Water: Balance to yield paste of 12.5 lb./gal. | |

When the evolution of heat ceases, the mixer 210 is shut off and solids permitted to settle to the bottom of the tank. A sample was then drawn for testing, and the results are reported in Column 1 of Table I. The waste in tank 209 was not aerated during this step of the process.

Valve 213 is closed and valve 214 is opened. The balance of the waste totaling 500 gallons in tank 204 is transferred to tank 216 in FIG. 2. The waste is permitted to cascade down the side of the wall of tank 216 in the same manner as described in tank 209. While the waste is being added to tank 216, it is aerated by means not shown in FIG. 2. When the waste covers mixing blade 217, the mixer is started. About 150 cc. of acid formula at 140° F. is added via line 218 after the mixer is started. When all of the acid formula has been added, about 100 cc. of alkaline formula at about 110° F. is added via line 219. A sample is taken, and an additional 35 cc. of alkaline formula are added to tank 216 to increase the rate of flocculation and raise the pH from 4.4 to 5.75. Aeration is continued until tank 216 is filled with the 500 gallons of waste from tank 204. The mixer is stopped and solids permitted to settle to the bottom of tank 216. A sample is then drawn for testing, and the results are reported in Column 2 of Table I.

The treated waste in tanks 209 and 216 are returned to tank 204 by pump 222 and lines 220, 221 and 223. After the waste has been blended in tank 204, it is pumped back into tank 209 through pump 206 and lines 205, 207 and 208. Valve 213 is opened and valve 214 is closed. As tank 209 is filling, the waste is aerated by means not shown in FIG. 2. After the waste covers mixing blade 210, the mixer is started. The waste in tank 209 is permitted to overflow through line 224 to tank 216. The waste is aerated as tank 216 is being filled. When all the waste in tank 204 has been transferred to tanks 209 and 216, pump 206 is stopped and all valves closed. When the tanks are filled, both mixers which were operating during the filling operation are shut off.

Solids are permitted to settle to the bottom of each tank. Samples are then drawn for testing, and the results are reported in Column 4 of Table I.

The untreated waste had an extremely obnoxious odor before processing. After chemicals were added, all preceptible odor disappeared.

TABLE I

| | Tank 209, 500 gals., treated | Tank 216, 500 gals., treated | Tank 204, 1,000 gals., untreated | Tanks 209 and 216, 1,000 gals., treated |
|---|---|---|---|---|
| Dissolved oxygen, p.p.m. | 5.9 / 5.8 | 6.7 / 6.7 | .9 | 6.55 / 6.57 |
| pH | 4.4 | 4.5 / 4.6 | 4.4 / 4.4 | 4.55 / 4.55 |
| Temp., °F. | 62 | 61 | 66 | 62 |
| Percent oxygen increase | 84.7 / 84 | 86.5 / 86.5 | | 86.3 / 86.4 |
| Nitrates (ammonium), p.p.m. | | | .4 / .4 | 0 / 0 |
| Polyphosphates, p.p.m. | | | 1.2 / 1.2 | 1.2 / 1.1 |
| Relative stability | | | (1) | (2) |
| Culture test for bacteria per liter | | | (3) | (4) |
| O.D.I. test: Diluted 50% (distilled) | 70 | 55 / 52 | 570 | 56 / 58 |
| P.p.m. | 72 | | | |
| Percent reduction B.O.D. | 87.5 / 87.5 | 90.5 / 91 | | 90.3 / 90.1 |
| 5-day B.O.D. test: P.p.m. | | | 300 / 310 | 9 / 9.5 |
| Percent reduction B.O.D. | | | | 97 / 97.5 |

[1] 144 hrs., no change (methylene blue).
[2] 48 hrs., clear.
[3] 1 liter, higher than 20,000.
[4] 1 liter, 0.

It will be apparent from the foregoing discussion that there are numerous advantages related to the practice of this invention. The B.O.D. of liquid wastes treated according to the process of this invention can be reduced at a relatively low cost per gallon treated. Treatment time is not excessive, and the treated waste is free from obnoxious odors. The clear water obtained after waste is treated can be safely discharged into rivers, lakes or streams. The process of this invention has broad application to different types of wastes, for example, industrial, municipal, and commercial wastes. The chemicals employed in this invention are readily available, relatively inexpensive and can be used to increase the productivity of existing waste treatment plants by elimination of some mechanical procedures. The chemical formulations contain only natural products, and are free of synthetic materials such as polyelectrolytes. Flocculated solids obtained from the process of this invention can be used as a fertilizer, or deposited in a polluted body of water, such as a settling pond, to assist in B.O.D. reduction. Furthermore, flocculated solids can be recirculated to earlier stages in the process to reduce the overall chemical cost and further lower B.O.D. It is to be noted that fish have lived for several months without additional feeding in the clear water obtained from municipal waste treated by the process of this invention.

What is claimed is:

1. A process for treating domestic, municipal or industrial liquid waste to reduce B.O.D. of the waste comprising adding a sufficient amount of an acid formula and a sufficient amount of an alkaline formula to said waste, to thereby cause evolution of heat and cause flocculation of solids, and separating the resulting solids from the liquid, said acid formula consisting essentially of:
   (a) about 30–98 weight percent aluminum sulfate,
   (b) about 2–20 weight percent of an alkali metal chloride, and
   (c) about 0.0005–0.1 weight percent of sodium or potassium hypochlorite.

2. The process of claim 1 wherein said acid formula also includes up to about 25 weight percent of an inorganic acid selected from the group consisting of phosphoric, hydrochloric, sulfuric, and nitric acids.

3. The process of claim 1 wherein said acid formula contains up to 25 weight percent of an organic acid selected from the group consisting of oxalic, formic, acetic and lactic acids.

4. The process of claim 1 wherein said alkaline formula consists essentially of:
   (a) about 10–25 weight percent aluminum sulfate,
   (b) about 35–60 weight percent sodium aluminate,
   (c) about 15–35 weight percent sodium hydroxide,
   (d) about 1–10 weight percent of an alkali metal chloride,
   (e) about 0.5–4 weight percent sodium or potassium hypochlorite,
   (f) about 1–7 weight percent of an alkali metal nitrate,
   (g) about 0.25–5 weight percent of an alkali metal carbonate, and
   (h) about 0.25–5 weight percent of an alkali metal bicarbonate.

5. The process of claim 1 wherein said alkaline formula contains up to about 2 weight percent calcium carbonate.

6. The process of claim 1 wherein said alkaline formula contains up to about 2 weight percent calcium chloride.

7. The process of claim 1 wherein the alkali metal chloride is sodium chloride, the alkali metal nitrate is sodium nitrate, the alkali metal carbonate is sodium carbonate and the alkali metal bicarbonate is sodium bicarbonate.

8. A process according to claim 4 wherein said waste is initially divided into a first portion and a second portion and said acid and alkaline formulae are added to separate portions such that said first portion has a pH of about 0–3 and said second portion has a pH of about 9–14, and thereafter mixing said first portion with said second portion to cause said evolution of heat.

9. The process of claim 8 wherein said waste contains suspended solids and the temperature of the acid and alkaline formulae is about 110°–150° F. prior to addition to the waste.

10. The process of claim 8 wherein said waste is aerated prior to separating the solids and liquids.

11. The process of claim 4 in which said waste is septic tank waste.

12. The process of claim 1 wherein said acid formula contains up to about 9 weight percent of an alcohol.

13. The process of claim 1 in which said waste is septic tank waste.

14. A process according to claim 1 wherein said waste is initially divided into a first portion and a second portion and said acid and alkaline formulae are added to separate portions such that said first portion has a pH of about 0–3 and said second portion has a pH of about 9–14, and thereafter mixing said first portion with said second portion to cause said evolution of heat.

15. The process of claim 14 wherein said waste contains suspended solids and the temperature of the acid and alkaline formulae is about 110°–150° F. prior to addition to the waste.

16. The process of claim 15 in which solids are separated from liquids by gravity settling.

17. The process of claim 16 in which the pH of the liquid is adjusted to about 6–8 by the addition of an organic or inorganic acid or base.

18. The process of claim 14 wherein said waste is aerated prior to separating the solids and liquids.

19. A process for treating domestic, municipal or industrial liquid waste to reduce B.O.D. of the waste said process comprising dividing said waste into a first portion and a second portion, adding to one of said portions an acid formula in an amount sufficient to adjust the pH of such portion to about 1.5–2.5, adding to the other of said portions an alkaline formula in an amount sufficient to adjust the pH of said other portion to about 9.5–11, mixing said portions together to thereby cause evolution of heat and to cause flocculation of solids, aerating said waste, and separating the resulting solids from the liquids, and further wherein said acid formula consists essentially of
   (a) about 78–82 weight percent aluminum sulfate,
   (b) about 6–8 weight percent of an alkali metal chloride,
   (c) about 10–12 weight percent of an inorganic acid selected from the group consisting of phosphoric, hydrochloric, sulfuric and nitric acids,
   (d) about 1–3 weight percent of an organic acid selected from the group consisting of oxalic, formic, acetic and lactic acids, and
   (e) about 0.001–0.002 weight percent sodium or potassium hypochlorite,
and said alkaline formula consists essentially of
   (a) about 15–19 weight percent aluminum sulfate,
   (b) about 34–42 weight percent sodium aluminate,
   (c) about 22–28 weight percent sodium hydroxide,
   (d) about 1.8–2.) weight percent of an alkali metal chloride,
   (e) about 1.0–1.2 weight percent sodium or potassium hypochlorite,
   (f) about 2–6 weight percent of sodium or potassium nitrate,
   (g) about 0.2–1 weight percent of calcium carbonate,
   (h) about 0.2–1 weight percent of calcium chloride,
   (i) about 0.4–2 weight percent sodium carbonate, and
   (j) about 0.4–2 weight percent sodium bicarbonate.

20. A process of claim 19 wherein said waste contains suspended solids and the temperature of the acid and alaline formulae is about 110°–150° F. prior to addition to the waste.

21. A process of claim 20 in which said acid formula contains up to about 9 weight percent isopropyl alcohol.

References Cited

UNITED STATES PATENTS

| 1,254,833 | 1/1918 | Moor | 210—44 X |
|---|---|---|---|
| 1,325,787 | 12/1919 | Grossman | 210—13 |

FOREIGN PATENTS

| 1,054,251 | 1/1967 | Great Britain. |
|---|---|---|
| 1,032,725 | 6/1966 | Great Britain. |
| 992,365 | 5/1965 | Great Britain. |
| 900,373 | 7/1962 | Great Britain. |
| 448,014 | 5/1936 | Great Britain. |

JOHN ADEE, Primary Examiner
R. H. SPITZER, Assistant Examiner

U.S. Cl. X.R.

210—56

UNITED STATES PATENT OFFICE
CERTIFICATE OF CORRECTION

Patent No. 3,812,032                     Dated May 21, 1974

Inventor(s) GEORGE M. CHAPPELL

It is certified that error appears in the above-identified patent and that said Letters Patent are hereby corrected as shown below:

INVENTOR: GEORGE M. CHAPPELL

Signed and sealed this 3rd day of December 1974.

(SEAL)
Attest:

McCOY M. GIBSON JR.
Attesting Officer

C. MARSHALL DANN
Commissioner of Patents